United States Patent Office.

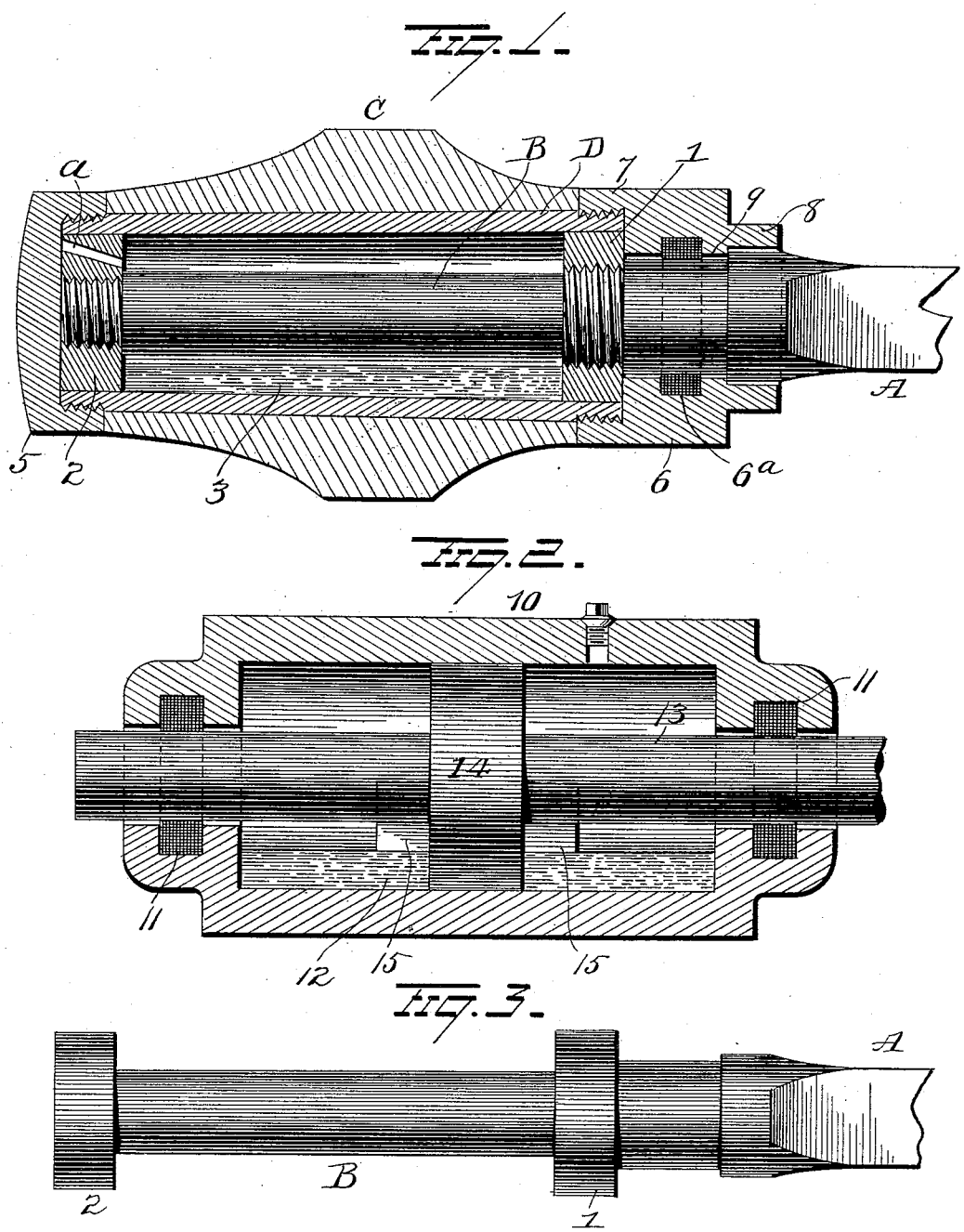

JACOB O. MARKS, OF URBANA, ILLINOIS.

LUBRICATING-BEARING.

SPECIFICATION forming part of Letters Patent No. 607,184, dated July 12, 1898.

Application filed February 12, 1898. Serial No. 670,125. (No model.)

*To all whom it may concern:*

Be it known that I, JACOB O. MARKS, of Urbana, in the county of Champaign and State of Illinois, have invented certain new and useful Improvements in Lubricating-Bearings; and I do hereby declare the following to be a full, clear, and exact description of the invention, such as will enable others skilled in the art to which it appertains to make and use the same.

My invention relates to an improvement in lubricating-bearings for wheels or shafting, the object of the invention being to so construct a lubricating-bearing as to always insure the free running of the wheel or spindle and by means of which an ample amount of lubricating-oil can at all times be stored and liability of the heating of the bearing be thus obviated.

A further object is to so construct a lubricating-bearing as to keep the lubricating-oil constantly agitated, and thus prevent the oil from becoming hard or stiff.

A further object is to produce a lubricating-bearing which shall be simple in construction, which shall comprise but few parts, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a sectional view of a vehicle hub and spindle, showing the application of my improvements thereto. Fig. 2 is a view showing the application of the invention to a bearing for line-shafting. Fig. 3 is a detail view.

A represents a vehicle-axle; B, the spindle thereon; C, the hub of a wheel, and D the axle-box of the hub. The spindle B is made comparatively small in diameter and provided at its respective ends with collars 1 2, on which the axle-box in the hub is adapted to rotate. The collar 1 at the inner end of the spindle is preferably screw-threaded internally, so as to screw on the inner end of the spindle, and the outer collar 2 may also be screw-threaded, so as to screw on the outer end of the spindle.

From the above-described construction and arrangement of parts it will be observed that there will be considerable space between the body of the spindle B and the axle-box, and this space forms an extensive chamber 3, in which an ample amount of oil can be contained to supply lubricant to the bearing for a considerable length of time, and thus avoid danger of the bearing becoming heated, which is likely to occur when a scant amount of lubricant is employed. The rotation of the hub will cause the lubricant to be continuously agitated and carried up by the collars 1 2, so as to maintain the supply of oil to the peripheries of said collars constant and abundant. The bearings of the axle-box being of limited extent—viz., the combined peripheral surfaces of the collars—the amount of oil used at any one instant to lubricate the bearings will be quite small, and as the oil-chamber is very large as compared with the bearing-surfaces of the collars it is apparent that sufficient oil can be carried in said chamber to supply ample lubricant for an almost indefinite time. The outer end of the axle-box and hub are closed tightly by means of a cap 5, adapted to screw on the end of the axle-box, and the inner end is tightly closed by means of an annular cap 6, having a flange 7 to screw on the axle-box and bear against the inner end of the hub. The caps 5 6 will thus confine the axle-box tightly within the hub. The annular cap 6 is provided with an annular flange or collar 8, adapted to rotate about the axle, and within said collar 8 a shoulder 9 is formed, against which a shoulder on the axle abuts.

The annular cap 6 is provided internally with a groove for the reception of packing $6^a$. The entire bearing of the hub is upon the collars 1 2, while the annular cap 6 and its collar 8 rotate about the axle without actual contact therewith, dust and moisture being excluded from the bearing by means of the packing $6^a$, and the collar 8 will serve to prevent the entrance into the bearing of mud which might fall on the axle from the wheel.

The inner collar 1 on the spindle is disposed in close proximity to the annular cap 6, and the outer collar 2 is disposed in close proximity to the outer cap 5, and thus lateral displacement of the hub will be prevented.

Instead of arranging the collars 1 2 at the respective ends of the spindle they may be arranged intermediate of the ends thereof, or a single collar may be used and prevented from lateral displacement by means of lugs secured in the boxing. This latter construction may be found preferable for bearings for line-shafting, as illustrated in Fig. 2, where the boxing 10 is shown provided at its respective ends with packing-rings 11. The boxing 10 will be made in two parts, as usual, Fig. 2 being a section through the two parts. The oil-chamber 12 within the boxing is made considerably larger than the diameter of the shaft 13, the same as in the construction hereinbefore described. The shaft 13 is provided with a single collar 14, which may be fixed thereto by means of a key or in any other desired manner and adapted to rotate with the shaft at a point centrally between the ends of the boxing, and all lateral movement of said collar (and consequently longitudinal movement of the shaft) will be prevented by means of lugs 15, secured within the boxing at respective sides of the collar. The entire bearing for the shaft in the box is on the collar.

The end bearing-collar 2 may be provided with a hole $a$, through which oil can be poured into oil-chamber, said hole being normally protected by the cap 5. Thus it will be seen that the oil-chamber can be replenished by removing the cap 5 and without the necessity of removing the wheel.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a lubricating-bearing, the combination with a boxing having an unbroken interior wall and a shaft extending through the boxing, the internal diameter of the boxing being much greater than the diameter of the shaft, whereby a large, annular chamber having straight, smooth, walls, is formed within the boxing, of a collar secured to the shaft within said annular chamber and having its bearing against the wall of said chamber, whereby oil in said chamber will be agitated when said collar passes through it and be thrown against the wall of the chamber to lubricate the bearing of the collar thereon, substantially as set forth.

2. In a lubricating-bearing, the combination with a spindle, an axle-box having an oil-chamber of much greater diameter than the diameter of the spindle and extending from end to end of the axle-box, and a hub on the axle-box of collars fixed on the spindle at the respective ends of said oil-chamber and having their bearings in said oil-chamber, the outer collar having an oil-hole, a cap on the outer end of the spindle and closing said oil-chamber and oil-hole, an annular cap secured to the axle-box at the inner end of the spindle and oil-chamber and encircling the axle, said annular collar bearing against one end of the hub and a packing within grooves in said annular cap, substantially as set forth.

3. The combination with an axle, the spindle thereon, a hub and an axle-box within the hub, said axle-box being of much greater internal diameter than the diameter of the spindle whereby to form an oil-chamber extending from end to end of said axle-box, of collars secured to the respective ends of the spindle and having their bearings in the axle-box and within said oil-chamber, a cap on the outer end of the axle-box, an annular cap on the inner end of the axle-box and having a collar to rotate about the axle, said caps and last-mentioned collar being out of actual contact with the spindle and a packing within said annular cap, substantially as set forth.

4. The combination with a spindle, a hub and an axle-box therein, said axle-box having an oil-chamber of much greater diameter than that of the spindle, of fixed collars on said spindle having their bearings in the axle-box and within said oil-chamber, and removable caps screwed on the respective ends of the axle-box and bearing against the ends of the hub and also against said fixed collars, substantially as set forth.

In testimony whereof I have signed this specification in the presence of two subscribing witnesses.

JACOB O. MARKS.

Witnesses:
R. S. FERGUSON,
GEORGE F. DOWNING.